Feb. 20, 1940. J. HUARTE 2,191,392
TIRE PROTECTING DEVICE
Filed Aug. 12, 1938

INVENTOR
JUSTO HUARTE
BY
ATTORNEY

Patented Feb. 20, 1940

2,191,392

UNITED STATES PATENT OFFICE 2,191,392

TIRE PROTECTING DEVICE

Justo Huarte, Buenos Aires, Argentina

Application August 12, 1938, Serial No. 224,615
In Argentina June 22, 1938

1 Claim. (Cl. 301—40)

This invention relates to a new device for protecting the tires of automobiles, trucks and similar vehicles, and has for its main object a new and simple device which entirely prevents cutting and other damages suffered by the tires upon becoming flat, whether by puncture or other causes, and which, if not noticed immediately by the driver, may cause the total destruction of said tires due to the action of the weight of the vehicle.

The new protecting device subject of the present invention is particularly adaptable to any vehicle employing pneumatic tires, and in view of its excellent economic features, as well as its ready adaption and efficient use, offers obvious advantages over all other devices and apparatus which have been proposed and used heretofore for the same purpose.

The invention also contemplates other objects which will become apparent from the course of the present specification.

Figure 2:
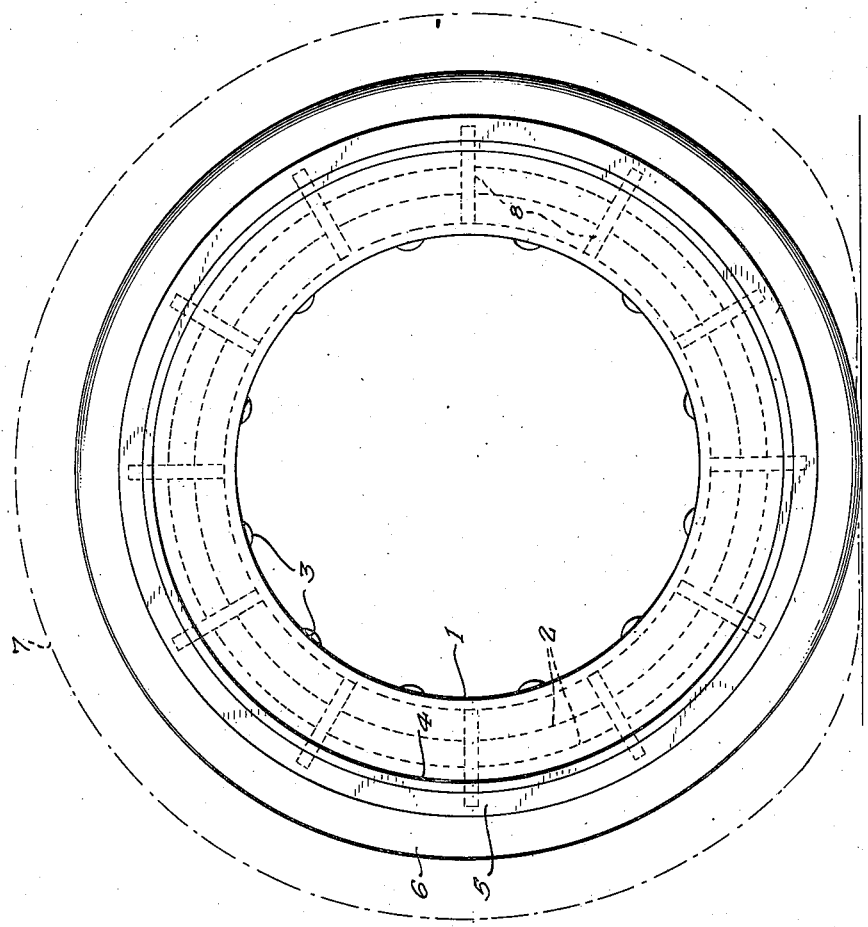
Figure 1:
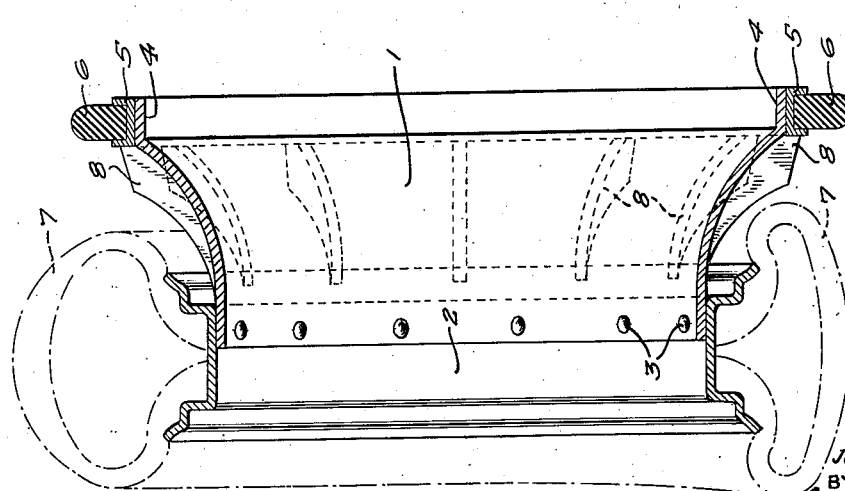

In order that the invention may be more clearly understood and easily carried into practice, same has been illustrated by way of example and in a preferred embodiment in the accompanying drawing, wherein:

Figure 1 is a sectional view of the device subject of the present invention, applied to a wheel having a flat tire; and Figure 2 shows a side elevation of the same device.

In the form illustrated, the new protecting device subject of the present invention comprises mainly a tubular body 1, preferably of frusto-conical shape, straight or curved, made of iron or other metallic material, cast or in sheet, and of which the smaller diameter end is fixed to the internal or side face of the rim 2 of the vehicle, as by rivets 3 or any other suitable means.

In turn, the large diameter end of said tubular body 1 has a peripherical flange 4, of cylindrical shape, on the external surface of which is adapted a small metallic rim 5, of U-section or the like, within which is adapted an elastic tire 6, of suitable shape and dimensions.

The above-described device is adapted to the internal faces of the corresponding vehicle wheels, so as to remain hidden under the vehicle without interfering with the free run thereof, or else it may be placed on the external face of the wheels, thus protecting the rim and tire also against lateral impacts.

Under normal conditions, that is to say, when the tire 7 is perfectly inflated, the elastic tire 6 remains suitably above the ground surface, since the external diameter of said tire 6 is somewhat smaller than the diameter corresponding to the pneumatic tire, but in turn it is larger than that of the metallic rim 2, as may be clearly seen in the upper portion of Figure 1.

Should the tire 7 become flat at any given moment, this would cause a certain vertical lowing of the corresponding wheel, in which case the elastic tire 6 would engage the ground surface, as shown on the lower portion of Figure 1, thus preventing the pneumatic tire 7 from becoming damaged due to the pressure of the edge of the metallic rim 2, and the vehicle can run in this condition until the pneumatic tire is changed or inflated.

If desired, the external surface of the tubular body 1 may carry radial fins 8, of suitable cross-section, which while reinforcing said body, may also serve as driving fins, thereby preventing the vehicle from becoming stopped in a swamp or the like.

The invention, as described above, is quite evident and requires no further explanation to those skilled in the art.

It is evident that several modifications in construction and detail may be introduced without departing from the scope of the present invention as clearly set forth in the appended claim.

What I claim is:

A vehicle wheel including a rim portion equipped with a pneumatic tire, an annular, hollow, flaring member fastened at its smaller end to the wheel rim and extending from said rim to one side of the wheel, a tire carried by the larger end of said member, said member and the tire carried thereby being axially alined with the wheel, the member-carried tire being of lesser diameter than the pneumatic tire when the latter is normally inflated and being of greater diameter than the pneumatic tire when the latter is deflated, said member-carried tire being spaced laterally from the wheel, and member-reinforcing and traction fins at circumferentially spaced points on the exterior of said member between the wheel and said member-carried tire, the outer edges of said fins being disposed inwardly of the periphery of said member-carried tire.

JUSTO HUARTE.